(12) United States Patent
Tanji (10) Patent No.: US 9,137,207 B2
(45) Date of Patent: Sep. 15, 2015

(54) INFORMATION PROCESSING APPARATUS COMMUNICATING WITH EXTERNAL DEVICE VIA NETWORK, AND INFORMATION PROCESSING METHOD THEREOF

(75) Inventor: Masamichi Tanji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 365 days.

(21) Appl. No.: 13/614,127

(22) Filed: Sep. 13, 2012

(65) Prior Publication Data

US 2013/0097691 A1  Apr. 18, 2013

(30) Foreign Application Priority Data

Oct. 17, 2011 (JP) .................................. 2011-227926

(51) Int. Cl.
*G06F 9/00* (2006.01)
*H04L 29/06* (2006.01)

(52) U.S. Cl.
CPC .................................. *H04L 63/0236* (2013.01)

(58) Field of Classification Search
USPC ................................................ 726/11, 12, 13
See application file for complete search history.

(56) References Cited

U.S. PATENT DOCUMENTS

| 2004/0184467 | A1 | 9/2004 | Watanabe | |
|---|---|---|---|---|
| 2005/0021939 | A1* | 1/2005 | Le et al. | 713/153 |
| 2008/0147776 | A1* | 6/2008 | Inoue | 709/202 |

FOREIGN PATENT DOCUMENTS

| CN | 101207629 | 6/2008 |
|---|---|---|
| CN | 101690030 | 3/2010 |
| JP | 2004-289782 A | 10/2004 |
| JP | 2008-154009 | 7/2008 |
| JP | 2009-10772 A | 1/2009 |
| WO | 2004/112346 | 12/2004 |

OTHER PUBLICATIONS

Japanese Office Action issued Jul. 7, 2015 during prosecution of related Japanese application No. 2011-227926.
Chinese Office Action issued on Jul. 27, 2015 during prosecution of related Chinese application No. 201210385522.9. (Whole English-language translation included.).

* cited by examiner

*Primary Examiner* — Christopher Brown
(74) *Attorney, Agent, or Firm* — Fitzpatrick, Cella, Harper & Scinto (57) ABSTRACT

An object of the present invention is to more appropriately filter a packet from an external device. This object is achieved by: obtaining address information of the external device from the packet; judging whether or not the address information of the external device has been registered as filter information; extracting, when it is judged that the address information has not been registered, device discrimination information of the external device from the address information of the external device; judging whether or not address information having the same device discrimination information as the extracted device discrimination information has been registered as the filter information; and registering, when it is judged that the address information having the same device discrimination information has been registered, the address information of the external device as the filter information.

8 Claims, 9 Drawing Sheets

INFORMATION PROCESSING APPARATUS COMMUNICATING WITH EXTERNAL DEVICE VIA NETWORK, AND INFORMATION PROCESSING METHOD THEREOF

BACKGROUND OF THE INVENTION

1. Field of the Invention

The present invention relates to an information processing apparatus which filters a packet received from a network.

2. Description of the Related Art

In recent years, since the Internet such as WWW (World Wide Web) or the like has become popular, vulnerability in network security such as remote accessing, attacking, packet wiretapping and the like from a suspicious external device has been worried. As a countermeasure for such a problem, a network device having a function to filter an IP (Internet Protocol) address (i.e., a filtering function) has become general. Here, in the filtering function, the address of an external device has been previously registered in a filter list of the network device so as to enable a user to refuse accessing to an arbitrary address or allow accessing to only an arbitrary address. Thus, the network device ensures security by cutting off connection from an external device having an unknown address.

However, in the IPv6 (Internet Protocol Version 6), one device can hold a plurality of addresses. Consequently, in a network device, if a user wishes to filter an IPv6 address by using the filtering function, it is necessary for the user to register, in a filter list, all the IPv6 addresses that the external device being the target holds.

In a case where the user manually registers the plurality of IPv6 addresses in the filter list, the user has a heavy workload. Moreover, when the plurality of addresses are manually registered, there are cases where incomplete registering, erroneous registering and the like occur, whereby there is a fear that the necessary address is excluded from the target of filtering. As a result, there occurs a problem of vulnerability in network security that the information processing apparatus is unwillingly accessed from an unspecified external device.

In the method proposed in Japanese Patent Application Laid-Open No. 2008-154009, when a user registers a certain address in a filter list, a network device makes an inquiry at a DNS (Domain Name System) server, and thus automatically obtains all the addresses held by an external device having the registered certain address.

That is, in Japanese Patent Application Laid-Open No. 2008-154009, since the network device automatically registers the addresses obtained from the DNS server in the filter list, the filtering in which incomplete registering, erroneous registering and the like do not occur is achieved without imposing a working burden on the user.

Here, it should be noted that the IPv6 address includes an address such as a stateless address of which the value is possibly changed periodically.

In any case, the stateless address is the address which is composed of a prefix number periodically distributed from a router and an interface ID (regularly, a numeric value generated from the MAC (media access control) address of the network device itself by a predetermined calculating method) unique on a network and generated by the network device itself. Here, the stateless address has an expiration date, and this expiration date depends on the setting content of the router. When the expiration date comes, a new prefix number is distributed by the router, and a new stateless address composed of the new prefix number and the interface ID of the device itself is generated.

SUMMARY OF THE INVENTION

The present invention is directed to an information processing apparatus which communicates with an external device via a network. Here, the information processing apparatus is characterized by comprising: a registering unit configured to register an IP (Internet Protocol) address as filter information; a receiving unit configured to receive a packet from the external device; an obtaining unit configured to obtain a transmission-source IP address from the received packet; an extracting unit configured to judge whether or not the transmission-source IP address obtained by the obtaining unit has been registered as the filter information, and, when it is judged that the transmission-source IP address has not been registered as the filter information, extract an interface ID from the transmission-source IP address; and an adding unit configured to judge whether or not an IP address having the same interface ID as the interface ID extracted by the extracting unit has been registered as the filter information, and, when it is judged that the IP address having the same interface ID has been registered, add the transmission-source IP address as the filter information.

According to the present invention, it is possible to more appropriately filter the packet from the external device.

Further features of the present invention will become apparent from the following description of exemplary embodiments with reference to the attached drawings.

DESCRIPTION OF THE EMBODIMENTS

Hereinafter, preferred embodiments of the present invention will now be described in detail with reference to the attached drawings. Incidentally, it should be noted that the embodiments do not limit the present invention, and all the configurations and constitutions described in the embodiments are not always necessary in the problem-solving means of the present invention.

First Embodiment

Figure 1:
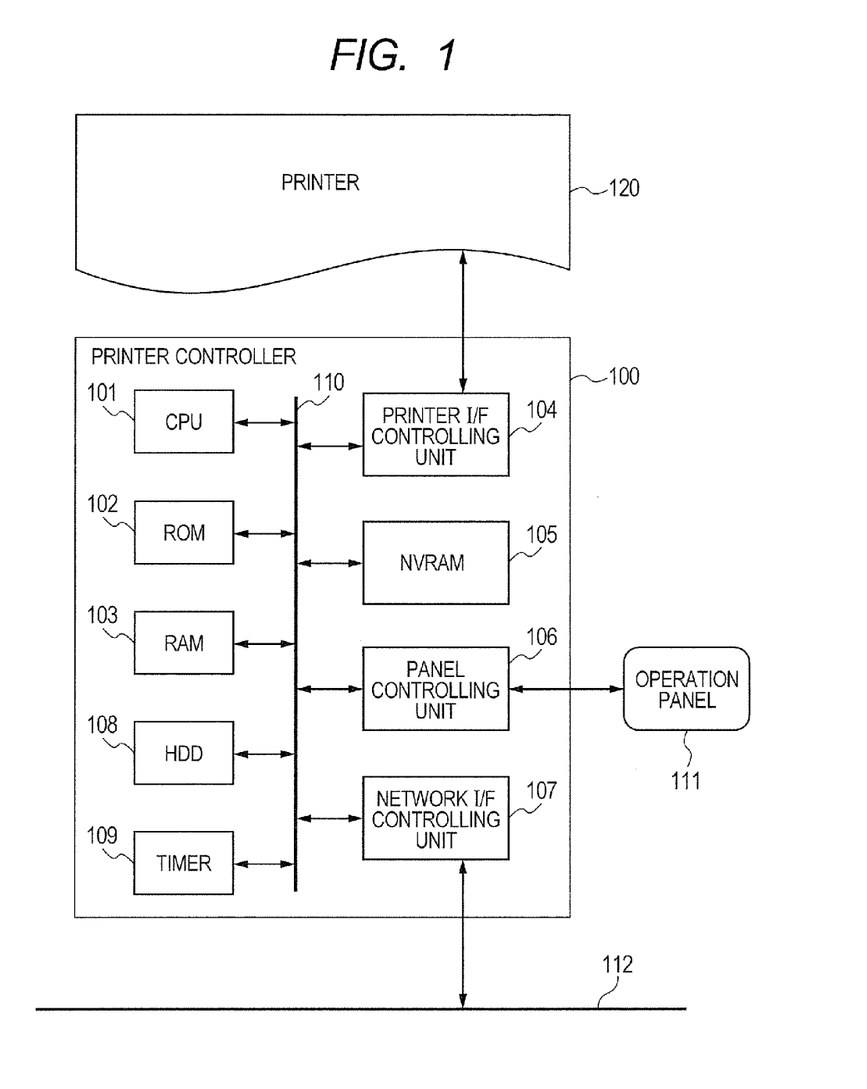
FIG. 1 is a block diagram illustrating an example of a hardware constitution of a digital multifunctional machine.

FIG. 1 is a block diagram illustrating an example of a hardware constitution of a digital multifunctional machine according to the first embodiment of the present invention.

A printer controller 100, which is an example of an information processing apparatus (computer), controls a printer 120.

In the printer controller 100, a CPU (central processing unit) 101 executes software programs of the digital multifunctional machine, and thus controls the whole of the digital multifunctional machine. That is, when the CPU 101 performs processes according to the procedures of the programs stored in a ROM (read-only memory) 102, an HDD (hard disk drive) 108 and the like, the functions of the digital multifunctional machine and processes in later-described flow charts are achieved. Incidentally, a part or all of the functions of the digital multifunctional machine and the processes in the later-described flow charts may be achieved by dedicated hardware.

The ROM 102 stores therein a boot program, fixed parameters and the like of the digital multifunctional machine. A RAM (random access memory) 103 stores therein temporary data and the like to be used when the CPU 101 controls the digital multifunctional machine. The HDD 108 stores therein various data such as print data and the like.

A timer 109 manages elapsed time and the like in a timer process. A printer I/F (interface) controlling unit 104 controls data transmission and reception (data communication) with the printer 120, and the like. An NVRAM (non-volatile random access memory) 105 stores therein various setting values for the digital multifunctional machine.

A panel controlling unit 106 controls an operation panel 111. Thus, under the control of the panel controlling unit 106, various information is displayed on and various instructions from users are input to the operation panel 111. A network I/F controlling unit 107 controls data transmission and reception with an external device connected via a network such as a LAN (local area network) 112 or the like.

The CPU 101, the ROM 102, the RAM 103, the HDD 108, the timer 109, the printer I/F controlling unit 104, the NVRAM 105, the panel controlling unit 106 and the network I/F controlling unit 107 are communicably connected on a bus 110. Incidentally, the bus 110 is a system bus via which control signals from the CPU 101, data signals among respective units, and the like are transmitted and received.

Figure 2:
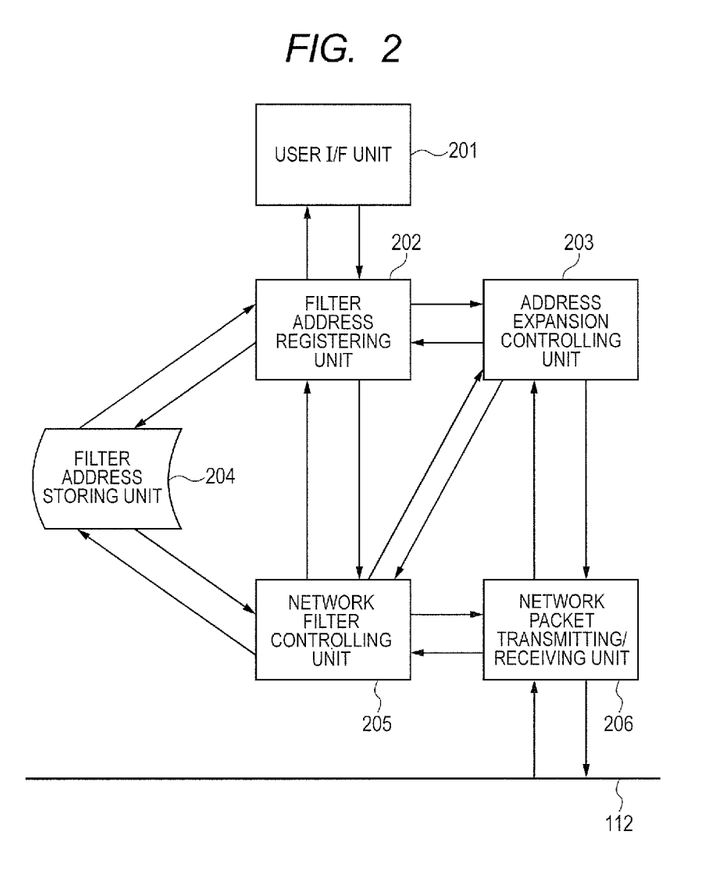
FIG. 2 is a block diagram illustrating an example of a processing unit of the digital multifunctional machine.

FIG. 2 is a block diagram illustrating an example of the constitution of a processing unit (module) of the digital multifunctional machine. More specifically, a user I/F unit 201 accepts a user's operation for registering an address (address information) to which filtering is performed. The address input from the user I/F unit 201 is stored (registered) in a filter address storing unit 204 by a filter address registering unit 202. Incidentally, the address which has been stored in the filter address storing unit 204 will be arbitrarily called a filter address (one example of filter information). Here, the filter address storing unit 204 is provided on the ROM 102, the HDD 108 or the NVRAM 105.

Further, when the address is registered, the filter address registering unit 202 transmits the registered address to an address expansion controlling unit 203 to judge whether or not an external device holding the registered address also holds another address. Then, the address expansion controlling unit 203, which received the address from the filter address registering unit 202, obtains the another address of the external device holding the received address, from an managing device or the like of managing the external device, by using a network packet transmitting/receiving unit 206. Further, the network packet transmitting/receiving unit 206 controls data communication with the external device.

Here, when the address has been registered in the filter address storing unit 204, the network packet transmitting/receiving unit 206 transmits the address of the external device to a network filter controlling unit 205 every time the network packet transmitting/receiving unit 206 receives a packet (network packet) from the external device.

When the address is received, the network filter controlling unit 205 confirms by referring to the filter address storing unit 204 whether or not the filter address corresponding to the received address exists. Then, when the corresponding filter address is found, the network filter controlling unit 205 performs a previously set process to the external device from which a connection request was transmitted.

Figure 3:
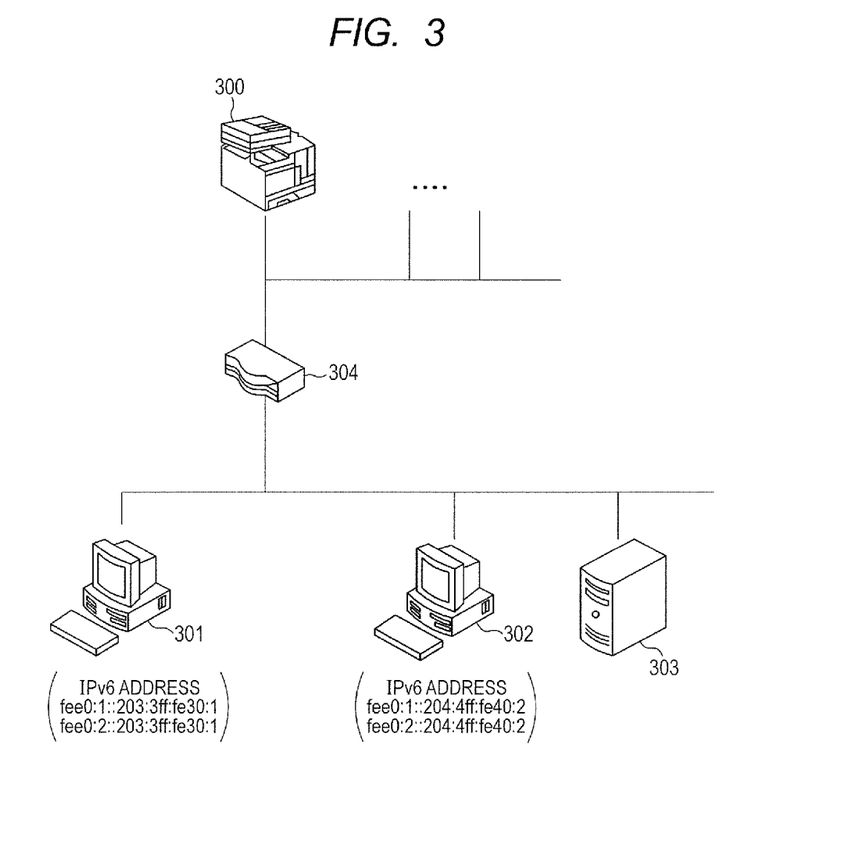
FIG. 3 is a diagram illustrating an example of a system configuration.

FIG. 3 is a diagram illustrating an example of the system configuration according to the present embodiment. Namely, the illustrated system is configured to include a network device 300, an external device 301, an external device 302, a DNS server 303, a router 304, and the like.

The network device 300 is an example of the digital multifunctional machine which comprises the printer controller 100, the operation panel 111 and the printer 120. Further, the network device 300 has a filtering function, and can be constituted to perform setting of filtering to the external devices (301, 302).

The external device 301 and the external device 302 perform communication with the network device 300 via the router 304 respectively from different subnets. In the present embodiment, it is assumed that two addresses of "fee0:1:: 203:3ff:fe30:1" and "fee0:2::203:3ff:fe30:1" have been held as the IPv6 addresses (IPv6 stateless addresses) in the external device 301. Besides, it is assumed that two addresses of "fee0:1::204:4ff:fe40:2" and "fee0:2::204:4ff:fe40:2" have been held as the IPv6 addresses in the external device 302.

Incidentally, each of the external devices 301 and the external device 302 further holds at least a link-local address as the IPv6 address. However, the link-local address is omitted from being displayed because it is not used in communication which exceeds a relay apparatus such as the router 304 or the like.

The DNS server 303 solves the IP addresses and the host names of the devices in the network.

Incidentally, although the present embodiment is directed to the example that the external device 301, the external device 302 and the DNS server 303 exist on the subnet which is different from the network device 300, the present invention is not limited to this network configuration. For example, the external device 301, the external device 302 and the DNS server 303 may respectively exist on the subnet which is the same as the network device 300 or the subnet which is different from the network device 300.

Figure 4:
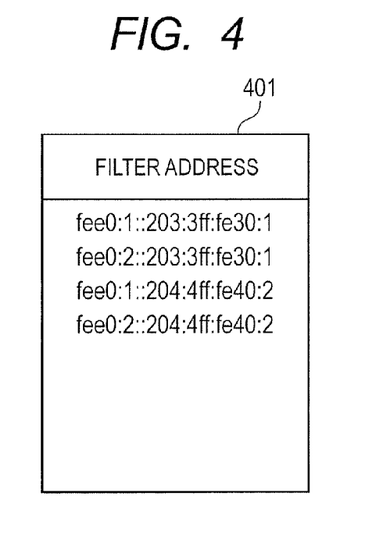
FIG. 4 is a diagram illustrating an example of a filter address.

FIG. 4 is a diagram illustrating an example of the filter address (filter address information 401) registered in the filter address storing unit 204 of the network device 300.

Here, it is assumed that the addresses of "fee0:1::203:3ff: fe30:1" and "fee0:2::203:3ff:fe30:1" held in the external device 301 have been registered in the filter address information 401. Besides, it is assumed that the addresses of "fee0: 1::204:4ff:fe40:2" and "fee0:2::204:4ff:fe40:2" held in the external device 302 have been registered in the filter address information 401.

Incidentally, the above registering process may be performed manually by the user as a whole or automatically by such a means as disclosed in Japanese Patent Application Laid-Open No. 2008-154009 or the like. In any case, since all the addresses held in the external device 301 and the external device 302 have been properly registered, the network device 300 is in the state capable of properly controlling the accessing from these external devices.

For example, when the access is tried from the external device 301 to the network device 300, the network packet transmitting/receiving unit 206 first receives the packet of the relevant access (access packet), and obtains the address of the transmission source from the access packet. In the present embodiment, it is assumed that the address "fee0:1::203:3ff: fe30:1" could be obtained as the address of the transmission source. Then, the network packet transmitting/receiving unit 206 transmits the address of the transmission source to the network filter controlling unit 205.

Subsequently, the network filter controlling unit 205 confirms, by referring to the filter address storing unit 204, whether or not the filter address corresponding to the received address of the transmission source exists. In the present embodiment, as illustrated in FIG. 4, since the address "fee0: 1::203:3ff:fe30:1" has been registered as the filter address, the network filter controlling unit 205 performs the previously set process to the relevant access packet.

Figure 5:
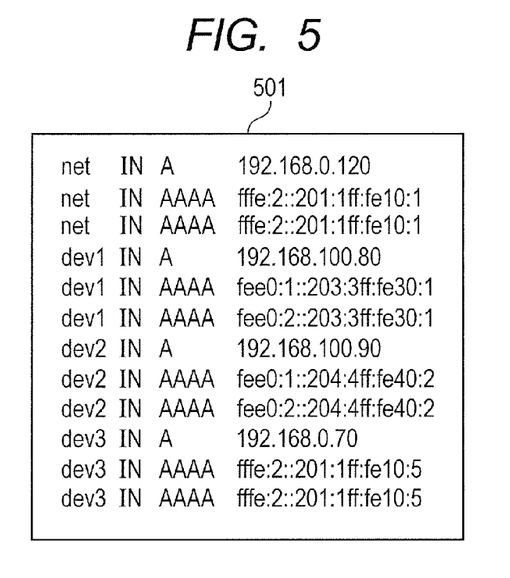
FIG. 5 is a diagram illustrating an example of information in which IP addresses and host names are associated with others.

FIG. 5 is a diagram illustrating an example of the information (setting file information 501) in which the IP addresses and the host names of the network device 300, the external device 301, the external device 302 and the like are associated with others.

The DNS server 303 refers to the setting file information 501 every time a request (DNS request) is sent from the client such as the network device 300 or the like, performs name resolution or the like, and then returns a response to the client. Further, the setting file information 501 is timely updated by a dynamic updating function {DDNS (Dynamic DNS function)} or the like of each device. For example, the setting file information 501 is updated when the address of each device is updated.

Here, in the configuration illustrated in FIG. 3, it is assumed that the IPv6 address of the external device 301 is changed on one occasion. That is, it is assumed that the conventional addresses "fee0:1::203:3ff:fe30:1" and "fee0: 2::203:3ff:fe30:1" are respectively changed to "1234:1::203: 3ff:fe30:1" and "1234:2::203:3ff:fe30:1".

The above change is caused by the reason that the expiration dates of the prefix numbers ("fee0:1" and "fee0:2") to be managed come in the router 304. Thus, the router 304 transmits new prefix numbers ("1234:1" and "1234:2") to the network on which the external device 301 exists. Incidentally, the prefix number is an example of communication line discrimination information for enabling to discriminate the communication line (the network or the like) to which the device (the external device 301 or the like) is connected.

Figure 6:
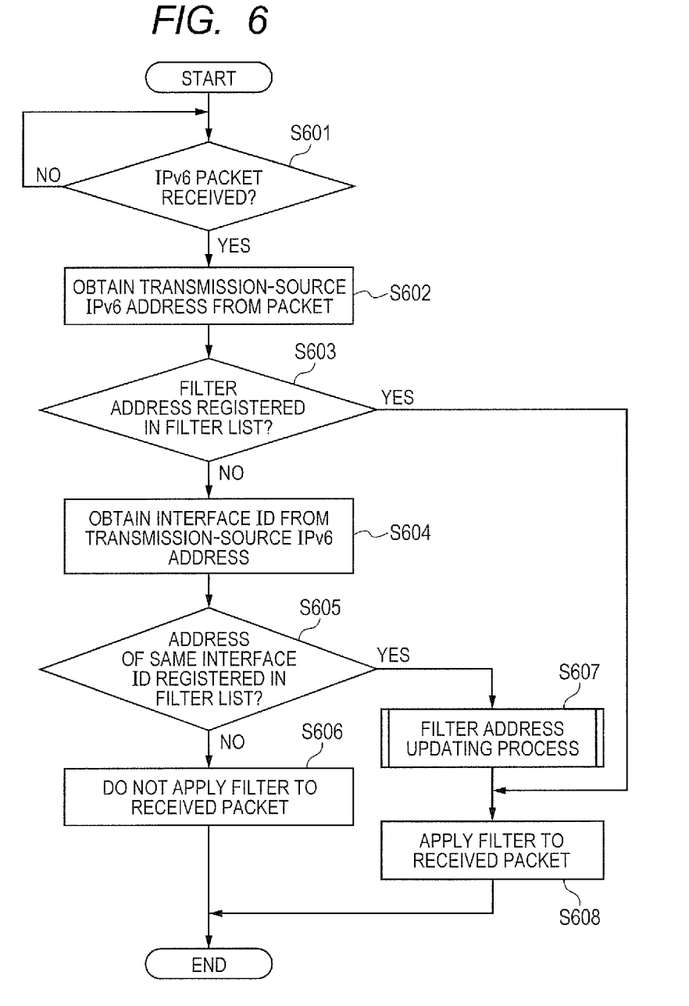
FIG. 6 is a flow chart indicating an example of a filter address automatic updating process.

FIG. 6 is a flow chart indicating an example of a filter address automatic updating process to be performed in the network device 300 when the address of the external device (in the following, the external device 301 will be exemplified) which is the target of filtering is changed. Here, it should be noted that the program concerning this flow chart and the data necessary to execute the program have been stored in the ROM 102, the HDD 108 and the like, and they are read and executed on the RAM 103 by the CPU 101.

First of all, the network packet transmitting/receiving unit 206 judges whether or not the packet is received from the external device (S601). At this time, when it is judged by the network packet transmitting/receiving unit 206 that the packet is received, the process is moved to S602. On the other hand, when it is judged that the packet is not received, the process is moved again to S601. In other words, the network device 300 waits that the network packet is received from the external device by the network packet transmitting/receiving unit 206. In the present embodiment, it is assumed that the network device 300 receives, from the address-changed external device 301, the packet of which the transmission source has the new IPv6 address of "1234:1::203:3ff:fe30:1".

In S602, the network packet transmitting/receiving unit 206 obtains the address of the transmission source from the received packet (S602). In the present embodiment, the address "1234:1::203:3ff:fe30:1" is obtained. Then, the network packet transmitting/receiving unit 206 transmits the address of the transmission source to the network filter controlling unit 205.

Subsequently, the network filter controlling unit 205 judges, by referring to the filter address storing unit 204 (i.e., a filter list), whether or not the filter address corresponding to the received address of the transmission source exists (S603). At this time, when it is judged by the network filter controlling unit 205 that the filter address exists, the process is moved to S608. On the other hand, when it is judged that the filter address does not exist, the process is moved to S604.

In S604, the network filter controlling unit 205 obtains the interface ID of the address of the transmission source (namely, extracts the interface ID from the address of the transmission source). Incidentally, the interface ID is an example of device discrimination information for enabling to discriminate the device (the external device 301 or the like), and corresponding to, e.g., the lower bit portion of the definition of the address of the transmission source.

Subsequently, the network filter controlling unit 205 judges whether or not the filter address having the obtained interface ID exists in the filter address storing unit 204 (S605). At this time, when it is judged by the network filter controlling unit 205 that the filter address exists, the process is moved to S607. On the other hand, when it is judged that the filter address does not exist, the process is moved to S606.

In S606, the network filter controlling unit 205 ends the process of this flow chart without performing the previously set process to the packet (access packet) received from the external device 301 (that is, without applying the filter).

In S607, a later-described filter address updating process (subroutine) is performed. Incidentally, for example, the address of the transmission source is registered in the filter address updating process.

Here, in the present embodiment, the filter address same as the address "1234:1::203:3ff:fe30:1" of the transmission source does not exist in the filter address storing unit 204. However, the addresses "fee0:1::203:3ff:fe30:1" and "fee0: 2::203:3ff:fe30:1" of the interface ID same as that of the address "1234:1::203:3ff:fe30:1" have been registered in the filter address storing unit 204. For this reason, the filter address updating process is performed.

In S608, the network filter controlling unit 205 performs the previously set process to the access packet (that is, applies the filter), and then ends the process of this flow chart.

Figure 7:
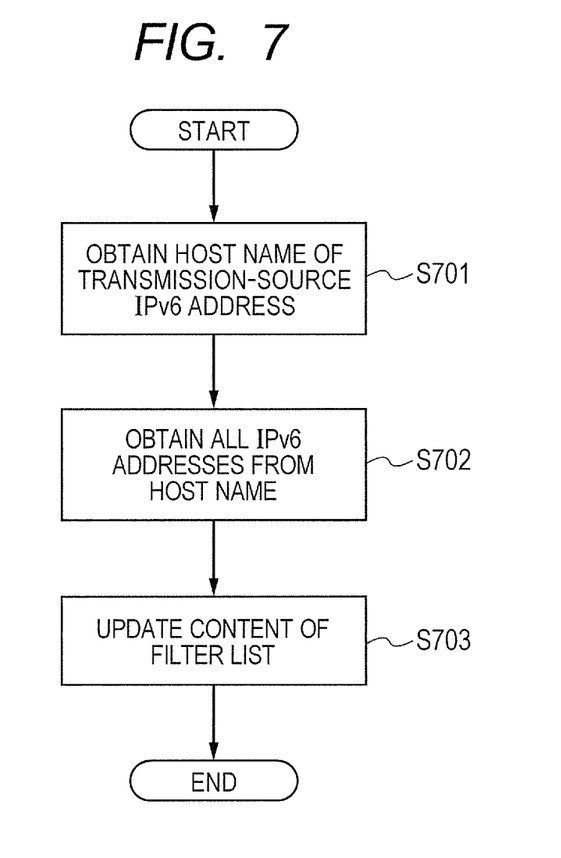
FIG. 7 is a flow chart indicating an example of a filter address updating process.

FIG. 7 is a flow chart indicating an example of the filter address updating process. Here, it should be noted that the program concerning this flow chart and the data necessary to execute the program have been stored in the ROM 102, the HDD 108 and the like, and they are read and executed on the RAM 103 by the CPU 101.

First of all, the address expansion controlling unit 203 makes an inquiry at the DNS server 303 by using the network packet transmitting/receiving unit 206, and thus obtains the host name of the external device which holds the address of the transmission source (S701). In the present embodiment, the address expansion controlling unit 203 makes the inquiry at the DNS server 303 about the host name of the address "1234:1::203:3ff:fe30:1". Then, the DNS server 303 returns the corresponding host name "dev1" to the network device 300 by referring to the content of the setting file information 501. Incidentally, it should be noted that the setting file information 501 has been updated from the change of the address of the external device 301 as described above.

Subsequently, the address expansion controlling unit 203 makes a query at the DNS server 303 about the IPv6 address of the host name "dev1", and thus obtains all the IPv6 addresses of the host name "dev1" (S702). Incidentally, it should be noted that the process in S701 to S702 is an example of an address information obtaining process which makes an inquiry at the managing device (the DNS server 303 or the like) based on the address information of the external device (the external device 301 or the like) and thus obtains another address information of the external device different from the above address information of the external device.

In the present embodiment, the addresses "1234:1::203:3ff:fe30:1" and "1234:2::203:3ff:fe30:1" are obtained as the IPv6 addresses corresponding to the host name "dev1". Then, the address expansion controlling unit 203 transmits all the IPv6 addresses of the host name "dev1" to the filter address registering unit 202.

Subsequently, the filter address registering unit 202 updates the content of the filter address storing unit 204 (S703). That is, the addresses "1234:1::203:3ff:fe30:1" and "1234:1::203:3ff:fe30:1" are registered in the filter address storing unit 204. Here, the addresses "fee0:1::203:3ff:fe30:1" and "fee0:2::203:3ff:fe30:1" are deleted from the already registered filter addresses. Then, the filter address registering unit 202 ends the process of this flow chart.

As just described, according to the present embodiment, even in the case where the stateless address of the external device which is the target of filtering is changed, this change is detected by the network device, whereby it is possible to update the contents of the filter list to the latest addresses.

Accordingly, it is possible by the network device to continuously perform the appropriate filtering without producing a time that the filtering cannot be performed. Further, in this regard, since it is unnecessary for the user to manually change the content of the setting, it is possible to drastically reduce the user's workload.

Second Embodiment

In the present embodiment, a filter address updating process which is different from that in the first embodiment will be described. More specifically, the filter address updating process in which the DNS server 303 is not used will be described. Incidentally, in the present embodiment, the constitutions and the structures same as those in the first embodiment are indicated by the same reference numerals and symbols respectively, and the descriptions thereof will be properly omitted.

Figure 8:
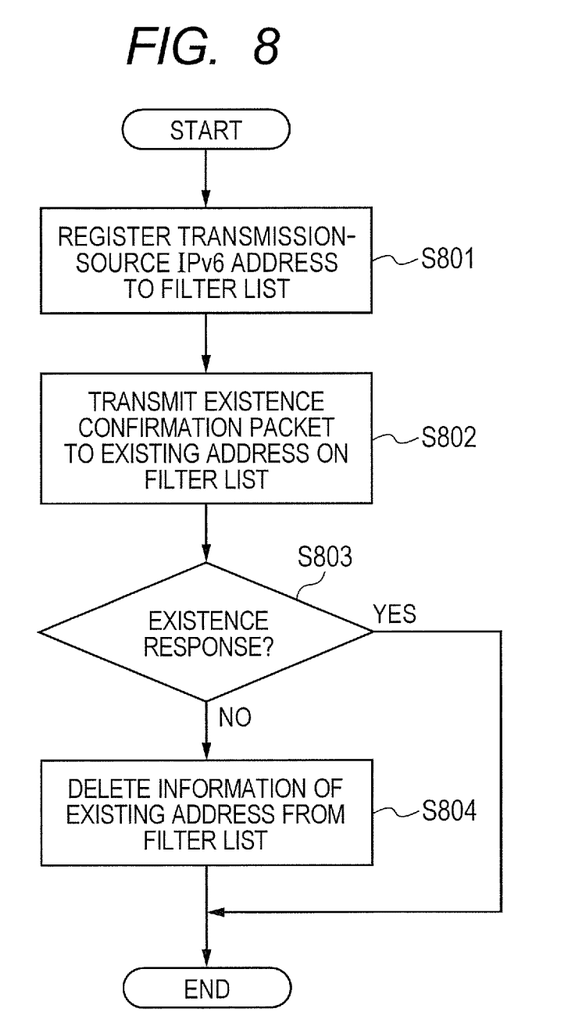
FIG. 8 is a flow chart indicating an example of a filter address updating process.

FIG. 8 is a flow chart indicating an example of the filter address updating process according to the present embodiment. Here, it should be noted that the program concerning this flow chart and the data necessary to execute the program have been stored in the ROM 102, the HDD 108 and the like, and they are read and executed on the RAM 103 by the CPU 101.

Incidentally, as well as the first embodiment, the filter address updating process is called in S607 of FIG. 6.

Initially, the network filter controlling unit 205 registers the address of the transmission source to the filter address storing unit 204 via the filter address registering unit 202 (S801). In the present embodiment, the address "1234:1::203:3ff:fe30:1" is newly registered in the filter address storing unit 204. Then, the addresses "fee0:1::203:3ff:fe30:1" and "fee0:2::203:3ff:fe30:1" of the interface ID same as that of the address "1234:1::203:3ff:fe30:1" are transmitted to the address expansion controlling unit 203.

Subsequently, the address expansion controlling unit 203 transmits an existence confirmation packet to the addresses "fee0:1::203:3ff:fe30:1" and "fee0:2::203:3ff:fe30:1" by using the network packet transmitting/receiving unit 206 (S802). Here, the existence confirmation packet is the packet to be used for confirming with the external device whether or not the relevant address is still used by the external device of this address, that is, whether or not the relevant address still exists. For example, the existence confirmation packet is a neighbor solicitation packet of the ICMPv6 (Internet Control Message Protocol for IPv6) for the relevant address.

Then, the address expansion controlling unit 203 awaits reception of an existence response packet sent in response to the existence confirmation packet for a predetermined period of time (that is, it awaits the existence response packet for a certain period of time). Subsequently, the address expansion controlling unit 203 judges whether or not the existence response packet is received (S803).

At this time, when it is judged that the existence response packet is received within the predetermined period of time (i.e., the certain period of time), the address expansion controlling unit 203 ends the process of this flow chart without performing a process of updating the filter address storing unit 204. In this case, for example, the address of "1234:1::203:3ff:fe30:1" is resultingly the IPv6 address newly added to the external device 301.

On the other hand, when it is judged that the existence response packet is not received within the predetermined period of time (i.e., the certain period of time), the address expansion controlling unit 203 judges that the relevant address is not already used, and the process is moved to S804. Incidentally, the existence response packet is the packet for the existence confirmation packet, and is, for example, a neighbor advertisement packet of the ICMPv6.

In S804, the address expansion controlling unit 203 deletes the address judged as not existing from the filter address storing unit 204 via the filter address registering unit 202, and ends the process of this flow chart.

As just described, according to the present embodiment, the network device can automatically detect that stateless address of the external device which is the target of filtering is changed, even under the network environment that the DNS server does not exist. Consequently, it is possible to update the contents of the filter list to the latest addresses.

Third Embodiment

In the present embodiment, it is further judged in the filter address updating process of the first embodiment whether or not another filter address which has been possibly changed exists in the filter address storing unit 204. Then, when it is judged that the relevant address exists, this address is also updated. Incidentally, in the present embodiment, the constitutions and the structures same as those in the first embodiment are indicated by the same reference numerals and symbols respectively, and the descriptions thereof will be properly omitted.

Figure 9:
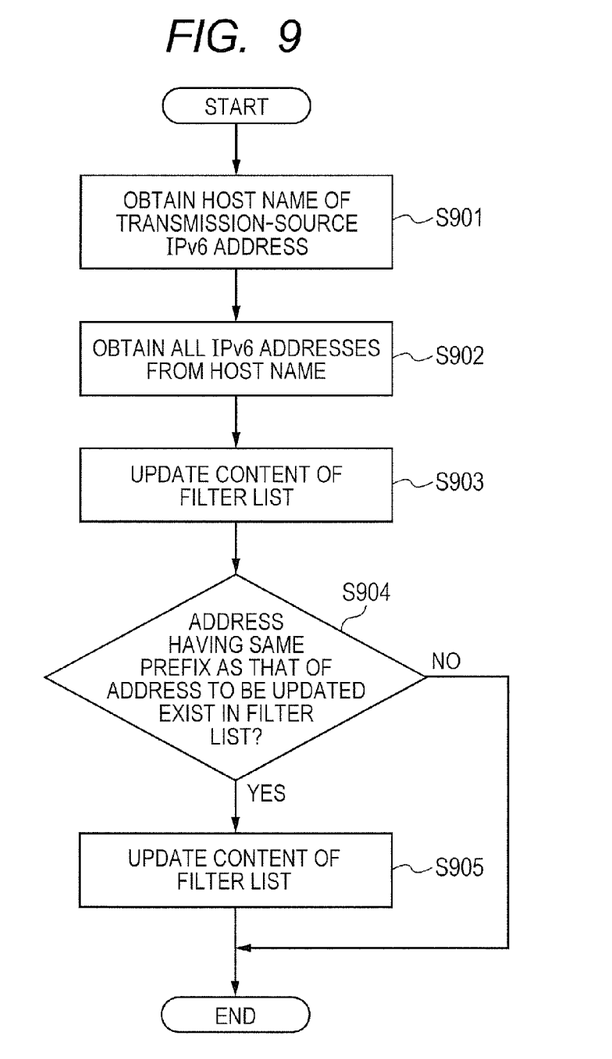
FIG. 9 is a flow chart indicating an example of a filter address updating process.

FIG. 9 is a flow chart indicating an example of the filter address updating process according to the present embodiment. Here, it should be noted that the program concerning this flow chart and the data necessary to execute the program have been stored in the ROM 102, the HDD 108 and the like, and they are read and executed on the RAM 103 by the CPU 101.

Incidentally, as well as the first embodiment, the filter address updating process is called in S607 of FIG. 6.

First, the address expansion controlling unit 203 makes an inquiry at the DNS server 303 by using the network packet transmitting/receiving unit 206, and thus obtains the host name of the external device which holds the address of the transmission source (S901). In the present embodiment, the address expansion controlling unit 203 makes the inquiry at the DNS server 303 about the host name of the address "1234:1::203:3ff:fe30:1". Then, the DNS server 303 returns the corresponding host name "dev1" to the network device 300 by referring to the content of the setting file information 501.

Subsequently, the address expansion controlling unit 203 makes a query at the DNS server 303 about the IPv6 address of the host name "dev1" by using the network packet transmitting/receiving unit 206, and thus obtains all the IPv6 addresses of the host name "dev1" (S902). In the present embodiment, the addresses "1234:1::203:3ff:fe30:1" and "1234:2::203:3ff:fe30:1" are obtained as the IPv6 addresses corresponding to the host name "dev1". Then, the address expansion controlling unit 203 transmits all the IPv6 addresses of the host name "dev1" to the filter address registering unit 202.

Subsequently, the filter address registering unit 202 updates the content of the filter address storing unit 204 (S903). That is, the filter address registering unit 202 rewrites, among the filter addresses registered in the filter address storing unit 204, the address "fee0:1::203:3ff:fe30:1" to the address "1234:1::203:3ff:fe30:1". Further, the filter address registering unit 202 rewrites the address "fee0:2::203:3ff:fe30:1" to the address "1234:2::203:3ff:fe30:1".

Subsequently, the filter address registering unit 202 judges whether or not a filter address having the same prefix number as that of the filter address (i.e., the filter address before the rewriting) exists in the filter address storing unit 204 (S904). At this time, when it is judged that the relevant filter address exists, the process is moved to S905. On the other hand, when it is judged that the relevant filter address does not exist, the filter address registering unit 202 ends the process of this flow chart.

In the present embodiment, the filter address of "fee0:1::204:4ff:fe40:2" having the same prefix number "fee0:1" as that of the address "fee0:1::203:3ff:fe30:1" exists. Further, the filter address of "fee0:2::204:4ff:fe40:2" having the same prefix number "fee0:2" as that of the address "fee0:2::203:3ff:fe30:1" exits.

Here, it is possible to judge that the address of the external device having the same prefix number has been likewise changed.

Therefore, in S905, when it is judged that the filter address having the same prefix number as that of the filter address before the rewriting exists in the filter address storing unit, the filter address registering unit 202 updates the relevant filter address by the prefix number same as that of the filter address updated in S903. That is, the filter address registering unit 202 rewrites the address "fee0:1::204:4ff:fe40:2" into the address "1234:1::204:4ff:fe40:2". Further, the filter address registering unit 202 rewrites the address "fee0:2::204:4ff:fe40:2" into the address "1234:2::204:4ff:fe40:2". Then, the filter address registering unit 202 ends the process of this flow chart.

As just described, according to the present embodiment, when the address of the transmission source of transmitting the access packet is updated, another filter address of which the address has been possibly changed is searched, and also the information concerning the searched filter address is updated.

According to the above constitution, when the access packet is thereafter received from the external device having the relevant address, it is possible to promptly perform the previously set filtering process.

Fourth Embodiment

In the present embodiment, it is further judged in the filter address updating process of the second embodiment whether or not another filter address which has been possibly changed exists in the filter address storing unit 204. Then, when it is judged that the relevant address exists, this address is also updated. Incidentally, in the present embodiment, the constitutions and the structures same as those in the first and second embodiments are indicated by the same reference numerals and symbols respectively, and the descriptions thereof will be properly omitted.

Figure 10:
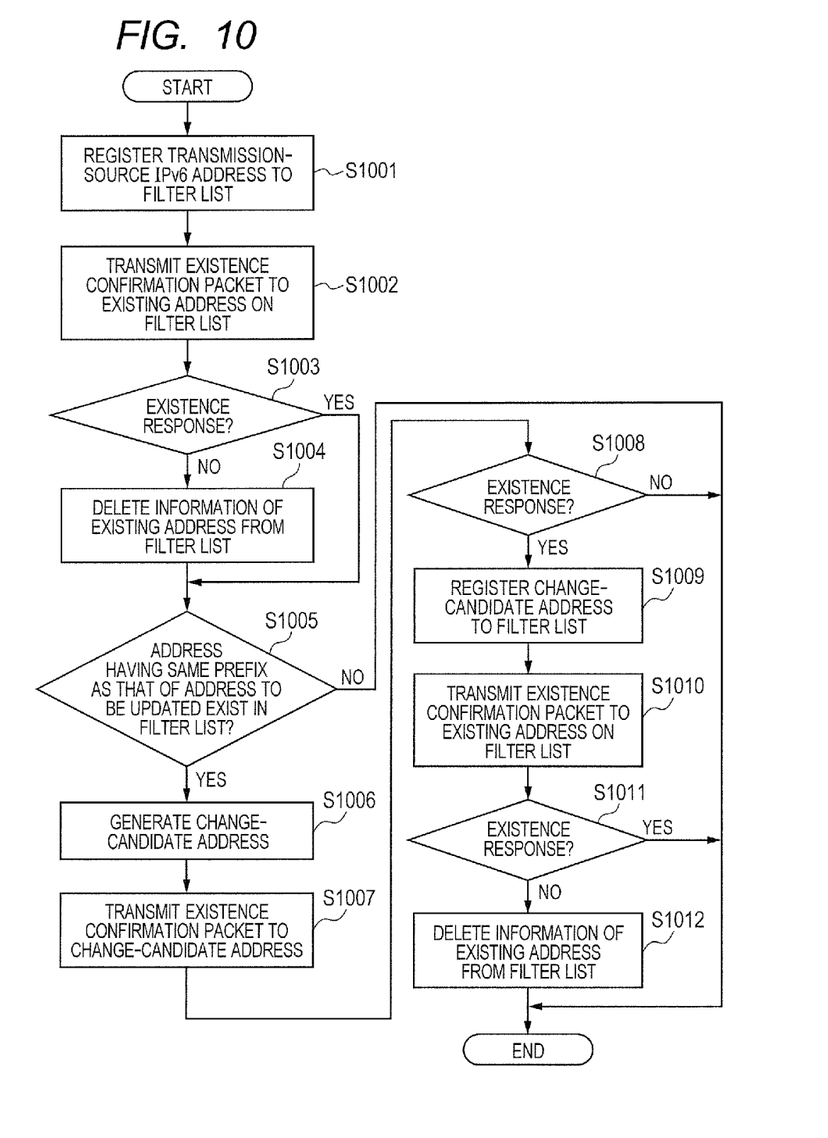
FIG. 10 is a flow chart indicating an example of a filter address updating process.

FIG. 10 is a flow chart indicating an example of the filter address updating process according to the present embodiment. Here, it should be noted that the program concerning this flow chart and the data necessary to execute the program have been stored in the ROM 102, the HDD 108 and the like, and they are read and executed on the RAM 103 by the CPU 101.

Incidentally, as well as the first embodiment, the filter address updating process is called in S607 of FIG. 6.

First, the network filter controlling unit 205 registers the address of the transmission source to the filter address storing unit 204 via the filter address registering unit 202 (S1001). In the present embodiment, the address "1234:1::203:3ff:fe30:1" is newly registered in the filter address storing unit 204. Then, the addresses "fee0:1::203:3ff:fe30:1" and "fee0:2::203:3ff:fe30:1" of the interface ID same as that of the address "1234:1::203:3ff:fe30:1" are transmitted to the address expansion controlling unit 203.

Subsequently, the address expansion controlling unit 203 transmits an existence confirmation packet to the addresses "fee0:1::203:3ff:fe30:1" and "fee0:2::203:3ff:fe30:1" by using the network packet transmitting/receiving unit 206 (S1002). For example, the existence confirmation packet is a neighbor solicitation packet of the ICMPv6 for the relevant address. Then, the address expansion controlling unit 203 awaits reception of an existence response packet sent in response to the existence confirmation packet for a predetermined period of time.

Subsequently, the address expansion controlling unit 203 judges whether or not the existence response packet is received (S1003). Here, the existence response packet is, for example, a neighbor advertisement packet of the ICMPv6.

At this time, when it is judged by the address expansion controlling unit 203 that the existence response packet is received within the predetermined period of time, the process is moved to S1005. In this case, for example, the address of "1234:1::203:3ff:fe30:1" is resultingly the IPv6 address newly added to the external device. On the other hand, when it is judged by the address expansion controlling unit 203 that the existence response packet is not received within the predetermined period of time, that is, when it is judged that the relevant address is not already used, the process is moved to S1004.

In S1004, the address expansion controlling unit 203 deletes the address judged as not existing from the filter address storing unit 204 via the filter address registering unit 202.

Subsequently, the filter address registering unit 202 judges whether or not a filter address having the same prefix number as that of the filter address (i.e., the filter address before the rewriting) exists in the filter address storing unit 204 (S1005). At this time, when it is judged by the filter address registering unit 202 that the relevant filter address exists, the process is moved to S1006. On the other hand, when it is judged that the relevant filter address does not exist, the filter address registering unit ends the process of this flow chart.

In the present embodiment, the filter address of "fee0:1::204:4ff:fe40:2" having the same prefix number "fee0:1" as that of the address "fee0:1::203:3ff:fe30:1" exists. Further, the filter address of "fee0:2::204:4ff:fe40:2" having the same prefix number "fee0:2" as that of the address "fee0:2::203:3ff:fe30:1" exits.

Here, it is possible to judge that the address of the external device having the same prefix number has been likewise changed.

Therefore, when the filter address having the same prefix number exists, the address expansion controlling unit 203 performs the existence confirmation also to the relevant filter address.

Subsequently, the address expansion controlling unit 203 generates the addresses which are thought of as candidate addresses after changing (change-candidate addresses) of the addresses "fee0:1::204:4ff:fe40:2" and "fee0:2::204:4ff:fe40:2" (S1006). The candidate addresses (an example of candidate address information) are generated by replacing the prefix number of these addresses by the prefix number of the address of the transmission source registered in S1001. That is, in the present embodiment, the addresses "1234:1::204:4ff:fe40:2" and "1234:2::204:4ff:fe40:2" are resultingly generated as the candidate addresses.

Subsequently, the address expansion controlling unit 203 transmits an existence confirmation packet to the candidates addresses by using the network packet transmitting/receiving unit 206 (S1007). Then, the address expansion controlling unit 203 awaits reception of an existence response packet sent in response to the existence confirmation packet for a predetermined period of time. Subsequently, the address expansion controlling unit 203 judges whether or not the existence response packet is received (S1008). At this time, when it is judged by the address expansion controlling unit 203 that the existence response packet is received within the predetermined period of time, the process is moved to S1009. On the other hand, when it is judged that the existence response packet is not received within the predetermined period of time, the address expansion controlling unit ends the process of this flow chart.

In S1009, the network filter controlling unit 205 registers the candidate addresses to the filter address storing unit 204 via the filter address registering unit 202. Further, the filter address registering unit 202 transmits the existing addresses registered in the filter address storing unit 204 to the address expansion controlling unit 203. In the present embodiment, the addresses "fee0:1::204:4ff:fe40:2" and "fee0:2::204:4ff:fe40:2" are transmitted.

Subsequently, the address expansion controlling unit 203 transmits an existence confirmation packet to the existing addresses by using the network packet transmitting/receiving unit 206 (S1010). Then, the address expansion controlling unit 203 awaits reception of an existence response packet sent in response to the existence confirmation packet for a predetermined period of time.

Subsequently, the address expansion controlling unit 203 judges whether or not the existence response packet is received (S1011). At this time, when it is judged that the existence response packet is received within the predetermined period of time, the address expansion controlling unit 203 does not perform a process concerning update of the filter address storing unit 204, and ends the process of this flow chart while leaving the existing addresses registered. On the other hand, when it is judged by the address expansion controlling unit 203 that the existence response packet is not received within the predetermined period of time, that is, when it is judged that the relevant address is not already used, the process is moved to S1012.

In S1012, the address expansion controlling unit 203 deletes the existing address from the filter address storing unit 204 via the filter address registering unit 202.

As just described, according to the present embodiment, even under the network environment that the DNS server does not exist, another filter address which has been possibly changed is detected when the address of the transmission source of the access packet is updated. Further, the existence confirmation is performed for this address.

According to the above constitution, when the access packet is thereafter received from the external device having the relevant address, it is possible to promptly perform the previously set filtering process.

Other Embodiments

In FIG. 6, the timing to perform the previously set process to the access packet received in S601 may be set before the timing to perform the filter address updating process. In this case, it is possible to avoid the situation that, since it takes a time for the filter address updating process, the transmission source of the access packet has to await the response for a long period of time.

Besides, the present invention is also achieved by performing the following process. That is, software (program) for achieving the functions of the above embodiments is supplied to a system or an apparatus via a network or various kinds of storing media, and then a computer (or a CPU or an MPU) in the system or the apparatus reads and executes the program.

According to the constitutions of the above embodiments, it is possible to more appropriately filter the packet transmitted from the external device.

Aspects of the present invention can also be realized by a computer of a system or an apparatus (or a device such as a CPU or an MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-227926, filed Oct. 17, 2011, which is hereby incorporated by reference herein in its entirety.

What is claimed is:

1. An information processing apparatus which communicates with an external device via a network, comprising:

a registering unit configured to register a plurality of IP (Internet Protocol) addresses as IP addresses for which communication should be allowed or prohibited;
a receiving unit configured to receive a packet from the external device;
an obtaining unit configured to obtain a transmission-source IP address from the received packet;
an extracting unit configured to extract a prefix number and an interface ID from the transmission-source IP address;
a first identifying unit configured to identify, from among the plurality of IP addresses registered by the registering unit, a first IP address having an interface ID that is the same as the interface ID extracted by the extracting unit;
a second identifying unit configured to identify, from among the plurality of IP addresses registered by the registering unit, a second IP address having a prefix number that is the same as a prefix number of the first IP address identified by the first identifying unit; and
a changing unit configured to change the prefix number of the first IP address and the second IP address to the prefix number extracted by the extracting unit,
wherein at least one of the registering unit, receiving unit, obtaining unit, extracting unit, first identifying unit, second identifying unit and changing unit are implemented by a processor and a memory.

2. The information processing apparatus according to claim 1, wherein
the information processing apparatus is communicably connected to a DNS (Domain Name System) server which manages IP address allocated to the external device,
the information processing apparatus further comprises an address information obtaining unit configured to obtain, by making an inquiry at the DNS server based on the IP address of the external device, another IP address of the external device different from the IP address of the external device, and
in case of judging that the IP address having the interface ID has been registered and further judging that the another IP address has been obtained by the address information obtaining unit, adding the another IP address to the registered IP addresses.

3. The information processing apparatus according to claim 1, further comprising a deleting unit configured to, in case of judging that the IP address having the interface ID has been registered, and further in case of transmitting a confirmation packet for confirming existence to the IP address having the interface ID, awaiting a response packet to the confirmation packet for a certain period of time, and judging that the response packet is not received in the certain period of time, delete the IP address having the interface ID from the registered IP addresses.

4. The information processing apparatus according to claim 1, wherein
the information processing apparatus further comprises a generating unit configured to, in case of judging that an IP address having the same prefix number as the prefix number of the IP address having the interface ID has been registered, generate a candidate address in which the prefix number of the IP address judged as having been registered has been changed to the prefix number of the IP address of the external device, and
in case of judging that the IP address having the interface ID has been registered, and further in case of transmitting a confirmation packet for confirming existence to the candidate address, awaiting a response packet to the confirmation packet for a certain period of time, and judging that the response packet is received in the certain period of time, adding the candidate address to the registered IP addresses.

5. The information processing apparatus according to claim 4, further comprising a deleting unit configured to, in case of transmitting a confirmation packet for confirming existence to the IP address judged as having been registered by the generating unit, awaiting a response packet to the confirmation packet for a certain period of time, and judging that the response packet is not received in the certain period of time, delete the IP address judged as having been registered by the generating unit from the registered IP addresses.

6. The information processing apparatus according to claim 1, wherein the IP address of the external device includes an IPv6 (Internet Protocol Version 6) stateless address.

7. A controlling method for an information processing apparatus which communicates with an external device via a network, the method comprising:
registering a plurality of IP (Internet Protocol) addresses as IP addresses for which communication should be allowed or prohibited;
receiving a packet from the external device;
obtaining a transmission-source IP address from the received packet;
extracting a prefix number and an interface ID from the transmission-source IP address;
identifying, from among the plurality of registered IP addresses, a first IP address having an interface ID that is the same as the extracted interface ID;
identifying, from among the plurality of registered IP addresses, a second IP address having a prefix number that is the same as a prefix number of the identified first IP address; and
changing the prefix number of the first IP address and the second IP address to the extracted prefix number.

8. A non-transitory computer-readable storage medium which stores a program to cause an information processing apparatus which communicates with an external device via a network to perform:
a registering step of registering a plurality of IP (Internet Protocol) addresses as IP addresses for which communication should be allowed or prohibited;
a receiving step of receiving a packet from an external device;
an obtaining step of obtaining a transmission-source IP address from the received packet;
an extracting step of extracting a prefix number and an interface ID from the transmission-source IP address;
a first identifying step of identifying, from among the plurality of IP addresses registered in the registering step, a first IP address having an interface ID that is the same as the interface ID extracted in the extracting step;
a second identifying step of identifying, from among the plurality of IP addresses registered in the registering step, a second IP address having a prefix number that is the same as a prefix number of the first IP address identified in the first identifying step; and
a changing unit configured to change the prefix number of the first IP address and the second IP address to the prefix number extracted in the extracting step.

* * * * *